July 4, 1967

G. BINDER 3,329,840

THREE-PHASE GENERATOR WITH DIRECT CURRENT OUTPUT

Filed March 17, 1964

INVENTOR
Georg Binder
by
Michael S. Striker
Attorney

July 4, 1967  G. BINDER  3,329,840
THREE-PHASE GENERATOR WITH DIRECT CURRENT OUTPUT
Filed March 17, 1964  4 Sheets-Sheet 2
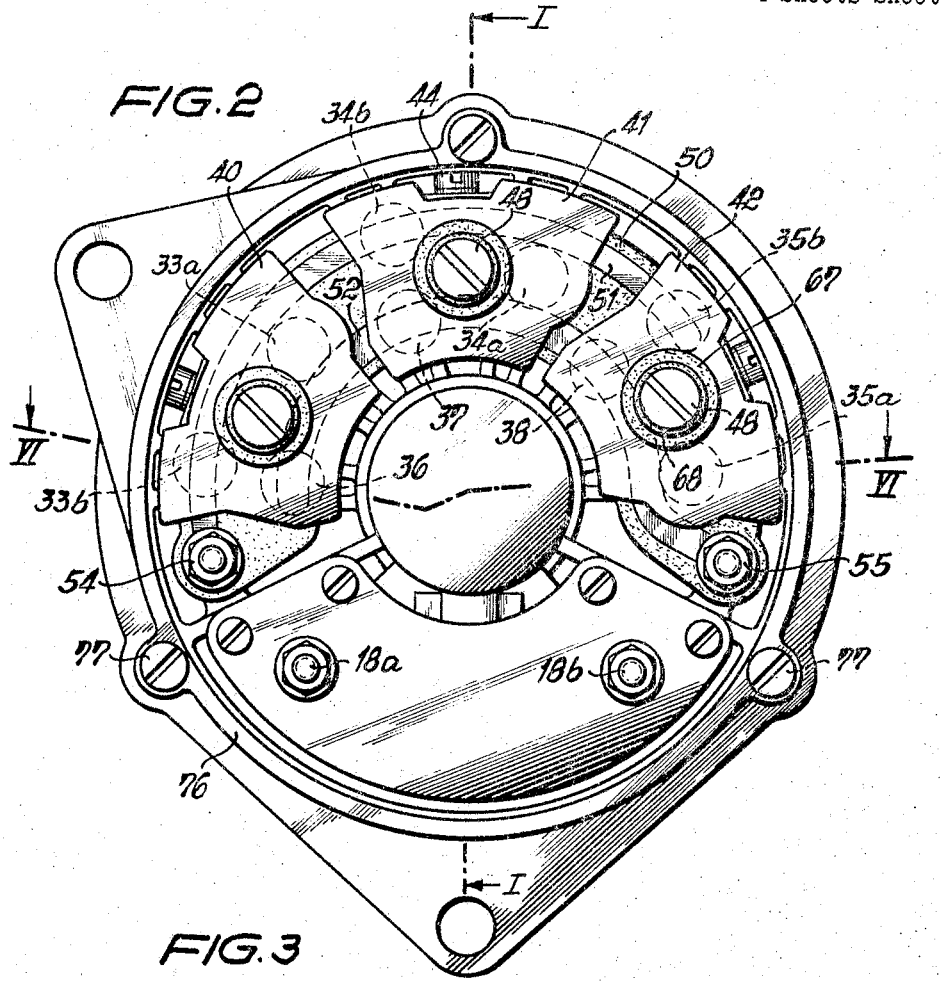
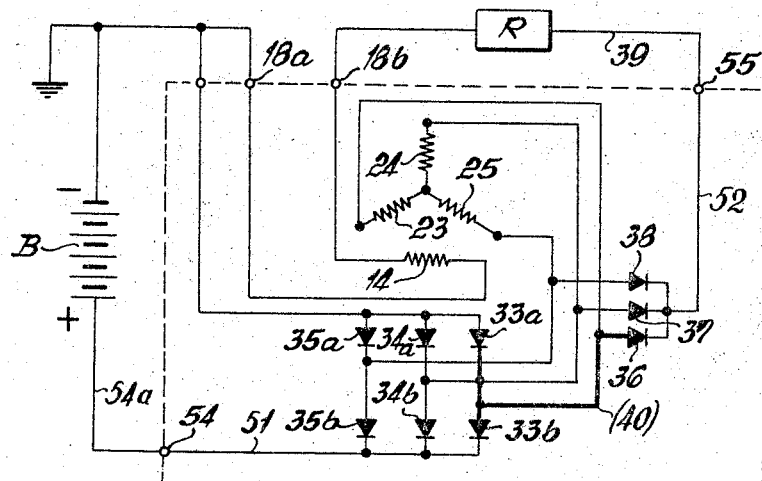
INVENTOR
Georg Binder
by
Michael S. Striker
Attorney July 4, 1967  G. BINDER  3,329,840
THREE-PHASE GENERATOR WITH DIRECT CURRENT OUTPUT
Filed March 17, 1964  4 Sheets-Sheet 3

INVENTOR
Georg Binder
by Michael S. Striker
Attorney

INVENTOR
Georg Binder
Michael S. Striker
Attorney

United States Patent Office 3,329,840
Patented July 4, 1967

3,329,840
THREE-PHASE GENERATOR WITH DIRECT
CURRENT OUTPUT
Georg Binder, Stuttgart, Germany, assignor to
Robert Bosch G.m.b.H., Stuttgart, Germany
Filed Mar. 17, 1964, Ser. No. 352,505
Claims priority, application Germany, Apr. 18, 1963,
B 71,548
7 Claims. (Cl. 310—68)

The present invention concerns three-phase generators with direct current output as they are conventionally used for producing the direct current supply for lighting installations particularly on motor vehicles. Generators of this type comprise three stationary output windings or stator windings which are connected by three pairs of rectifiers with the two poles or terminals of a storage battery and additionally via a set of three corresponding exciter rectifiers or diodes with the field or exciter winding of the generator.

It has been found that in conventional generators of this type a very considerable amount of work is to be invested in assembling the electric components and establishing the required connections. These connections must be carried out very carefully in view of the vibrations and shocks to which they must be expected to be exposed when the vehicle is operated on which the particular generator is used. Otherwise there is the danger that some of the connections may break during operation.

It is therefore an object of this invention to provide for a structure of a three-phase generator of the type mentioned above which is characterized by as compact as possible a rectifier assembly which occupies little space in the generator housing and requires no or only insignificant assembling and connecting work.

It is another object of this invention to provide for a generator as set forth in which the various rectifiers of the assembly will be cooled sufficiently even at low operating speeds of the generator and are permitted nevertheless to be subjected to full load.

With above objects in view the invention includes in a three-phase generator with direct current output, in combination, housing means having a main axis; three stator windings mounted in said housing means symmetrically relative to said axis; an exciter winding arranged for cooperation with said stator windings; positive output means including three positive output rectifiers, each connected to a different one of said stator windings, respectively, and including positive connector means conductively connecting the positive terminals of said positive output rectifiers with each other; negative output means including three negative output rectifiers, each connected to a different one of said stator windings, respectively, and including negative connector means for conductively connecting the negative terminals of said negative output rectifiers with each other; three exciter current rectifiers, each connected between said exciter winding and a different one of said stator windings, respectively; three support plate means at least partly of conductive material mounted in said housing means and insulated therefrom, each being associated with and conductively connected with a different one of said stator windings, and each carrying a different group of three rectifiers associated with the respectively associated stator winding, namely one of said positive output rectifiers, one of said negative output rectifiers, and one of said exciter current rectifiers, each of said rectifiers of said group having one of its terminals in contact with the particular support plate means for connection with the respective stator winding; and conductor means in contact with the other terminal of all of said exciter current rectifiers for connecting the latter with each other.

In an arrangement as specified above it has been found as particularly advantageous if each of the various rectifiers is lodged or held in a bore or recess of said support plate means, the recesses being advantageously located all on one face of that support plate. Under these circumstances it is possible that the rectifiers held in these recesses are pressed by attaching means e.g. a screw bolt passed through the individual support plate, against a plate of insulating material extending transverse of the main axis of the generator housing and carrying two contact strips insulated against each other and being preferably concentric with each other so that the exposed electrodes or terminals of the individual rectifiers are placed in firm contact with the proper one of these contact strips. The contact strips serve as conductors from the respective rectifiers to certain terminals as will be explained further below. In the above mentioned attaching device a screwbolt is located substantially in the center of the individual support plate while the three rectifiers carried by each support plate are arranged so as to surround this center point then a three-point contact is achieved which makes sure that all three rectifiers of one such group thereof are pressed with the same contact pressure against the connecting strips or the like which are part of the circuit of the individual rectifiers. In order to make sure that even after continued operation and even after frequent substantial temperature changes a uniform contact pressure is maintained it is advisable to place one or several spring washers under the heads of the above mentioned screw bolts whereby the desired contact pressure is maintained even in the case of substantial thermal expansions occurring in the assembly.

A particular advantage of the arrangement according to the invention is that the rectifiers or rather the groups thereof can be preassembled in the respective support plates and tested for proper operation before being assembled in a generator. In assembling the generation relatively few manipulations are necessary and particularly almost no or insignificant electrical connections have to be established because the various components are so designed and constructed that the required connections between components are automatically established upon mechanical assembly. In addition, in the case of damage or failure each individual support plate including the group of rectifiers carried thereby can be easily removed from the generator and replaced by a new unit.

It has been found to be particularly advantageous if in accordance with the invention the above mentioned plate of insulating material carrying concentric contact or conductor strips is shaped as an annular sector and if furthermore the individual support plates are provided along opposite edges with rims which project beyond the face of the respective support plate containing the above mentioned recesses holding the rectifiers so that upon assembling the individual support plate with the plate of insulating material the support plate is automatically guided and located in the correct relation to the plate of insulating material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is an end view in axial direction of the generator according to FIG. 1, the view being taken from the rear end;

FIG. 3 is a schematic circuit diagram of the generator arrangement;

Figure 1:
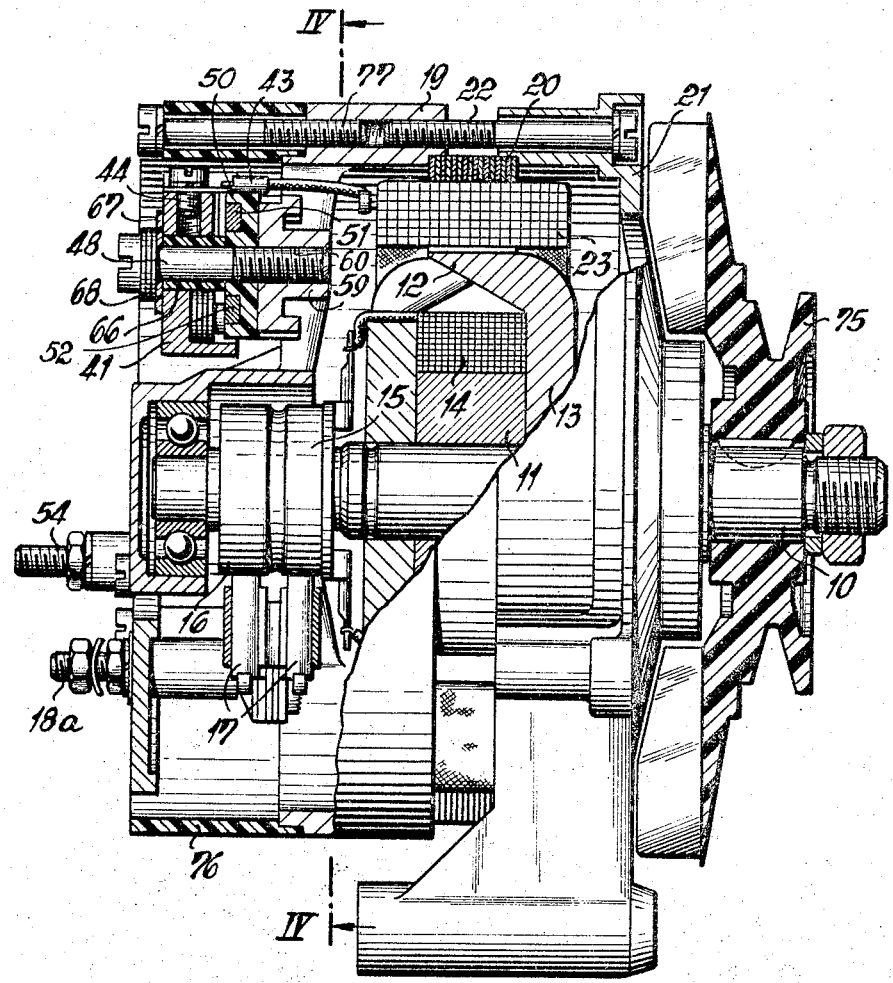
FIG. 1 is an elevation of a generator according to the invention, partly in section along line I—I of FIG. 2.

The illustrated three-phase generator is of the type specifically designed for generating current for supplying the lighting installation of a motor vehicle. It comprises an armature shaft 10 carrying an armature 11 composed of two plates 13 provided along their circumference with hook-shape intermeshing poles 12 and holding between themselves the exciter winding 14. This exciter winding 14 is connected via slip rings 15 and 16 and respectively associated brushes 17 and brush holders with terminals 18a and 18b. These terminals are mounted in a substantially cup-shape rear bearing plate 19. The rear bearing plate 19 is assembled by means of screws 22 with a front bearing cover 21 and the stack of stator laminations 20 is held between the members 19 and 21 in a corresponding recess.

The stack of stator laminations 20 carries three stator windings 23, 24 and 25 evenly distributed about its circumference and connected with each other according to the Y-system. As can be seen from the circuit diagram FIG. 3, each of the stator windings is connected with a junction point between a respectively associated pair of output rectifiers 33a, 33b; 34a, 34b; 35a, 35b, respectively. In addition to these output rectifiers which carry the output current of the generator three exciter current rectifiers or diodes 36, 37 and 38 are provided and each thereof is also connected with a different one of the three stator windings while the opposite terminals of these rectifiers are connected jointly by a conductor 39 with a conventional voltage regulator R and in this manner with the already above mentioned terminal 18b of the exciter circuit.

As can be seen further from FIG. 3 the positive terminals of the positive output rectifiers 33b, 34b and 35b are connected via a common conductor 51 with a terminal 54 which, in turn, is connected by line 54a with the positive terminal of a storage battery B. Similarly the negative terminals of the negative output rectifiers 33a, 34a and 35a are connected by a common conductor with the grounded negative terminal of the battery B. The other terminal 18a of the exciter circuit is also connected with the grounded negative battery terminal.

Figure 7:
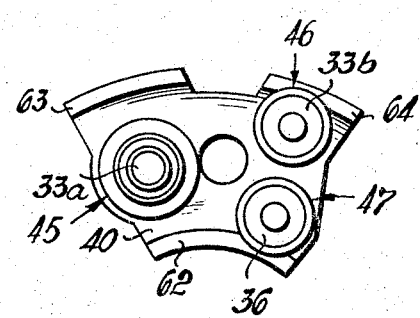
FIG. 7 is a plan view of a single support plate carrying three rectifiers constituting one group thereof.
Figure 5:
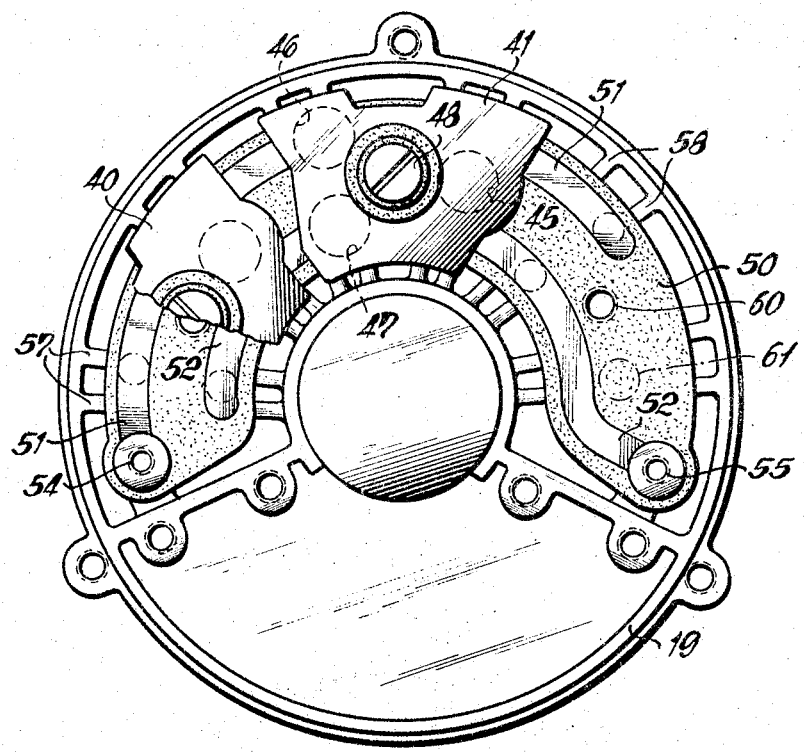
FIG. 5 is a view similar to FIG. 2 but showing only the rear bearing plate, the insulating support plate and some of the support plates carrying the rectifiers.
Figure 6:
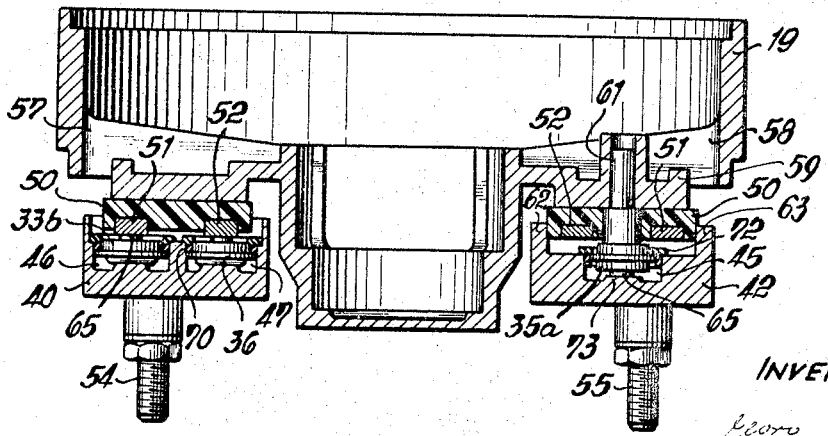
FIG. 6 is a sectional view of the arrangement illustrated by FIGS. 1–5, the section being taken along line VI—VI of FIG. 2.

In order to provide for as compact as possible a structure for the entire rectifier arrangement and also in order to make sure that all the rectifiers are sufficiently cooled even at low rotary speeds of the generator so that they are able to carry the full ordinary load, the invention provides for three support plates 40, 41 and 42 one of which is illustrative separately in FIG. 7 while several of these plates are shown in assembled position in FIG. 2 and in FIG. 5. As can be seen from FIG. 1, each of these plates 40, 41 and 42 is connected by a cable terminal lug 43 and a terminal screw 44 with the respective one of the associated stator windings 23, 24 or 25. Each of these support plates 40–42 which are identical with each other and are therefore inter-exchangeable is provided with three blind bores or recesses 45, 46 and 47 arranged on the same face of the particular support plate, said recesses surrounding a central hole which serves to pass therethrough a screw bolt 48 insulated by a bushing 66 and a washer 67 against the support plate 41 as shown in FIG. 1. In the recess 45 is lodged one of the negative output rectifiers, 33a, 34a or 35a, as the case may be, while in the recess 46 located more closely to the outer rim of the support plate one of the positive output rectifiers 33b, 34b or 35b is lodged. The third recess 47 nearer to the inner rim of the support plate contains one of the exciter current rectifiers or diodes 36, 37 or 38, as the case may be. The arrangement is such that for instance the support plate 40 symbolically illustarted in FIG. 3 by a very heavy connection line is connected with the stator winding 23 and carries the negative and positive output rectifiers 33a and 33b as well as the exciter current rectifier 36. Similarly the support plate 41 connected with the stator winding 24 carries the negative and positive output rectifiers 34a and 34b as well as the exciter current rectifier 37. Finally the third support plate 42 connected with the third stator winding 25 carries the negative and positive output rectifiers 35a and 35b and in addition the exciter current rectifier 38.

A plate of insulating material and having substantially the shape of an annular sector 50 best recognizable in FIG. 5 is arranged to extend in a plane transverse of the main axis of the generator and carries two concentric contact or conductor strips 51 and 52 preferably embedded in the plastic material. The outer conductor strip 51 is conductively connected with a terminal bolt 54 adapted to have attached to it a cable connection 54a leading to the battery B. When the arrangement is completely assembled the projecting positive terminals of the three positive output rectifiers 33b, 34b and 35b abut against the common conductor 51. Similarly, the terminals of the exciter rectifiers 36, 37 and 38 contact the inner conductor strip 52 which terminates in a screw bolt 55 to which a connection leading to the voltage regulator R and to the terminal 18b of the exciter circuit may be attached.

Figure 4:
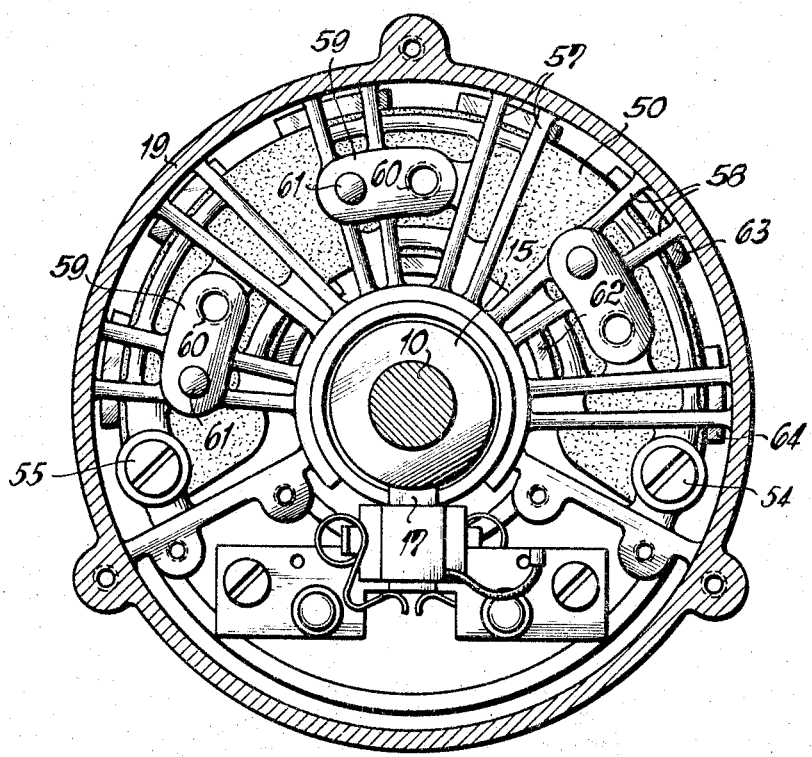
FIG. 4 is a sectional view, the section being taken along line IV—IV of FIG. 1 in the direction of the arrows indicated therein.

As can be seen best from FIG. 4 the rear bearing plate 19 is shaped like a wheel and is provided with a plurality of pairs of spokes or ribs 57, 58, each pair of these ribs being connected by a boss 59. Each of these bosses is provided with a threaded hole 60 designed to receive one of the screw bolts 48 by means of which the individual support plates 40, 41, 42 are urged toward the bearing plate 19. In addition each of these bosses 59 carries a copper contact pin 61 which is forced with its shank into a corresponding hole provided in the boss. The projecting head of the pin 61 penetrates through a corresponding hole in the insulated plate 50 and projects somewhat beyond the face of the latter so that it is engaged conductively with the terminal of one of the negative output rectifiers 33a, 34a and 35a, as the case may be, so that all these last mentioned terminals of these rectifiers are connected through the contact pins 61 and the conductive bearing plate 19 with each other and with the grounded negative terminal of the battery B. As mentioned above, due to the fact that the attaching screw bolt 48 is located in a position central relative to the three rectifiers constituting a group associated with a particular support plate, the outside terminals of the three rectifiers have three-point contact with the corresponding conductive members against which they abut. In this manner it is sure that the contact pressure between these component parts is uniform.

In order to facilitate the assembly work and in order to assure a correct position of the individual support plates 40, 41 and 42 relative to the insulating plate 50 each of the plates 40, 41, 42 is provided along its inner and outer rim with projecting end portions 62, 63, 64 which project from the face of the particular support plate which carries the rectifiers. Consequently, when the individual support plates are assembled with the insulating plate 50 the projecting edge portions 62–64 will overlap the edges of the plate 50 whereby the respective support plate is securely located in relation to the plate 50.

In order to assure a permanent and well maintained contact pressure of the rectifiers on the corresponding conductive members against which they abut, it is advisable to place underneath the head of the attaching screws 48 one or several spring washers 68. In this manner it is assured that even after extensive operation and after frequent considerable temperature changes the contact pressure between the rectifiers and the respective conductors remains satisfactory.

The assembly of the support plates 40-42 with the remainder of the generator is very considerably facilitated if the rectifiers are so firmly held in their respective recesses of the support plate that they cannot drop out of this recess. This can be effected most satisfactorily if the rectifiers are forced with press-fit or at least with frictional fit into the respective recess. In the above described example silicon rectifiers are used which have a tablet-shape housing constituting one terminal of the rectifier while the opposite electrode 65 is mounted with glass insulation in this housing and thus can be subjected to satisfactory contact pressure.

Therefore it is also advisable to provide rings or washers 70 made of an elastic synthetic material e.g. of nylon and mounted adjacent to the positive output rectifiers 33b, 34b and 35b as well as to the exciter current rectifiers 36, 37 and 38. In this manner the rectifiers are satisfactorily held in their respective recesses.

In order to be able to use as negative output rectifiers 33a, 34a and 35a silicon rectifiers of the same type as those used as positive output rectifiers 33b, 34b and 35b, elastic insulating rings or washers 72 are located in the recesses 45 of the support plate 40, 41 and 42 which are to receive the negative output rectifiers so that in this manner these rectifiers are insulated against the respective support plate and additionally it is assured that only the insulated electrode of the rectifier can make contact with a projecting contact point 73 provided at the bottom of the particular recess.

A combined fan and pulley 75 mounted on the armature shaft 10 serves to suck coolant air as a stream from the rear end into and through the generator housing, the front bearing cover 21 being provided with corresponding openings. In order to make sure that this stream of coolant air passes as closely as possible along the support plates 40, 41 and 42 which have also the task to serve as cooling plates a rearwardly projecting duct or tubular member 76 made of insulating material is mounted on the rear rim of the rear bearing plate 19 and is attached by means of screws 77 which are threaded into the same threaded holes which receive the assembly screws 22. This duct or tubular extension 76 is assembled with the remainder of the generator housing only after the support plates 40, 41 and 42 have been tightly pressed by means of the attaching bolts 48 against the ribs or spokes 57, 58 with the insulating plate 50 interposed therebetween, and after the terminal screws 44 have been tightened for connecting the support plates via the cable lugs 43 with the respectively associated stator winding.

Since the individual support plates 40, 41 and 42 and the insulating plate 50 with the connector strips 51 and 52 establish automatically the necessary connections between and with the rectifiers mounted thereon, it is not necessary at all during the assembly of the generator to install any connecting lines with the only exception of establishing the connections between the stator windings and the support plates. The fact that the rectifiers are assembled as groups of three with the respectively associated support plates results in the most welcome possibility of producing pre-assemblies of these groups which can be tested for proper functioning before they are placed in the generator. In a similar manner in a case of failure or damage each of these units can be easily exchanged without the danger of having a wrong connection made by an unexperienced operator.

It will be understood that each of the elements described above, or two or more together, may also find a useful application in other types of a three-phase generator with direct current output differing from the types described above.

While the invention has been illustrated and described as embodied in a three-phase generator with direct current output characterized by a plurality of support plate means each carrying a group of rectifiers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a three-phase generator with direct current output, in combination, housing means having a main axis; three stator windings mounted in said housing means symmetrically relative to said axis; an exciter winding arranged for cooperation with said stator windings; three positive output rectifiers; three negative output rectifiers; three exciter current rectifiers; three support plate means consisting at least partly of conductive material and each provided on one face thereof with three recesses dimensioned for holding therein respectively three rectifiers, namely one of said positive output rectifiers, one of said negative output rectifiers, and one of said exciter current rectifiers with one of the terminals of each of the three rectifiers on each support plate means in contact with the conductive material thereof, each of said support plate means being associated with and conductively connected with a different one of said stator windings; positive connector means arranged opposite the other terminals of said positive output rectifiers; negative connector means arranged opposite the other terminals of said negative output rectifiers; conductor means arranged opposite the other terminals of the said exciter current rectifiers; and fastening means for each support plate means for fastening the respective support plate means to said housing means and for pressing thereby the other terminals of the rectifier means mounted on the respective support plate means against the respective means located opposite said other terminals.

2. In a three-phase generator as defined in claim 1, wherein said fastening means include a fastening bolt for each support plate means connected to a substantial central portion of the respective support plate means.

3. In a three-phase generator as defined in claim 1, wherein said other terminals of said rectifier means project beyond said one face of the respective support plate means.

4. In a three-phase generator as defined in claim 1, wherein said support plate means are arranged in said housing so as to extend in a plane transverse to said main axis.

5. In a three-phase generator as defined in claim 4, wherein said housing means includes a rear bearing plate comprising radially extending spoke members and including a substantially annular plate of insulating material interposed between said spoke members and said support plate means, said positive connector means and said conductor means consisting of conductive strips carried on one face of said annular plate facing said one face of each of said three support plate means.

6. In a three-phase generator as defined in claim 5, wherein said bearing plate is formed from electrically conductive material, and wherein said negative connector means include a contact pin for each of said negative output rectifiers, each of said contact pins being at one end thereof in contact with the other terminal of the respective negative output rectifier and at the other end thereof with said bearing plate.

7. In a three-phase generator as defined in claim 6, wherein each of said contact pins projects through a hole in said insulating plate.

References Cited

UNITED STATES PATENTS

| | | | |
|---|---|---|---|
| 3,041,484 | 6/1962 | Freer et al. | 310—68 |
| 3,146,362 | 8/1964 | Bates | 310—68 |
| 3,184,625 | 5/1965 | Farison | 310—68 |
| 3,198,972 | 8/1965 | Lason | 310—68 |
| 3,226,581 | 12/1965 | Brewster | 310—68 |
| 3,250,928 | 5/1966 | Bates | 310—68 |
| 3,253,167 | 5/1966 | Bates et al. | 310—68 |

MILTON O. HIRSHFIELD, *Primary Examiner.*

J. D. MILLER *Assistant Examiner.*